United States Patent
Kelley

(10) Patent No.: US 11,882,120 B2
(45) Date of Patent: Jan. 23, 2024

(54) IDENTITY INTERMEDIARY SERVICE AUTHORIZATION

(71) Applicant: HEWLETT PACKARD ENTERPRISE DEVELOPMENT LP, Houston, TX (US)

(72) Inventor: Thomas Kelley, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 977 days.

(21) Appl. No.: 16/526,680

(22) Filed: Jul. 30, 2019

(65) Prior Publication Data
US 2021/0037011 A1    Feb. 4, 2021

(51) Int. Cl.
| | |
|---|---|
| H04W 12/06 | (2021.01) |
| H04W 12/069 | (2021.01) |
| G06F 21/44 | (2013.01) |
| H04L 9/40 | (2022.01) |
| H04L 9/32 | (2006.01) |
| G06F 21/33 | (2013.01) |

(52) U.S. Cl.
CPC ........ H04L 63/0884 (2013.01); H04L 9/3263 (2013.01); H04L 63/0823 (2013.01)

(58) Field of Classification Search
CPC .............. H04L 63/0884; H04L 9/3263; H04L 63/0823; H04L 9/0894; H04L 9/3247; H04L 63/0892
See application file for complete search history.

(56) References Cited

U.S. PATENT DOCUMENTS

| | | | |
|---|---|---|---|
| 9,225,711 B1 * | 12/2015 | Sorensen | ............ H04L 63/0815 |
| 2007/0143829 A1 * | 6/2007 | Hinton | ................ H04L 63/0815 726/8 |
| 2009/0288155 A1 * | 11/2009 | Joshi | ................... H04L 63/0823 726/9 |

(Continued)

FOREIGN PATENT DOCUMENTS

WO    WO-2009122162 A1 * 10/2009      ......... H04L 63/0815

OTHER PUBLICATIONS

Ed Kamya Kiyemba Edris, Mahdi Aiash, Jonathan Kok-Keng Loo; "Network Service Federated Identity (NS-FId) Protocol for Service Authorization in 5G Network"; 2020 Fifth International Conference on Fog and Mobile Edge Computing (FMEC); Year: Mar. 2020; Conference Paper; Publisher: IEEE; pp. 128-135 (Year: 2020).*

(Continued)

*Primary Examiner* — Fatoumata Traore
*Assistant Examiner* — Courtney D Fields
(74) *Attorney, Agent, or Firm* — Hewlett Packard Enterprise Patent Department

(57) ABSTRACT

Examples include service authentication for a principal. A request to access a first service of a plurality of services of a network may be received from a principal by an identity intermediary. An identifier of the first service may be stored at the identity intermediary, and an unsigned credential of the principal and a principal identifier may be transferred from the identity intermediary to a credential provider. The principal identifier and the credential signed by the credential provider may be received, and the signed credential may be transmitted to the first service for authentication.

20 Claims, 6 Drawing Sheets

(56) References Cited

U.S. PATENT DOCUMENTS

2013/0191884 A1* 7/2013 Leicher ............... H04W 12/069
726/4

OTHER PUBLICATIONS

Ahuvia, M., "What Is An Identity Provider (IdP) and Do You Need One?" Aug. 29, 2017, https://blog.gemalto.com/security/2017/08/29/identity-provider-idp-need-one/.

Anicas, M., "An Introduction to OAuth2," Jul. 21, 2014, https://www.digitalocean.com/community/tutorials/an-introduction-to-oauth-2.

Github, Inc., "bluedatainc/jupyterhub-samlauthenticator," retrieved online Jul. 30, 2019, https://github.com/bluedatainc/jupyterhub-samlauthenticator/blob/master/samlauthenticator/samlauthenticator.py.

Oasis, "Security Assertion Markup Language (SAML) V2.0 Technical Overview, Committee Draft 02," Mar. 25, 2008, http://docs.oasis-open.org/security/saml/Post2.0/sstc-saml-tech-overview-2.0.html.

Oasis, "Assertions and Protocols for the Oasis Security Assertion Markup Language (SAML) V2.0," Mar. 15, 2005.

Oasis, "Authentication Context for the Oasis Security Assertion Markup Language (SAML) V2.0," Mar. 15, 2005.

Oasis, "Bindings for the OASIS Security Assertion Markup Language (SAML) V2.0," Mar. 15, 2005.

Oasis, "Conformance Requirements for the Oasis Security Assertion Markup Language (SAML) V2.0," Mar. 15, 2005.

Oasis, "extensible Access Control Markup Language (XACML) Version 3.0," Jan. 22, 2013, http://docs.oasis-open.org/xacml/3.0/xacml-3.0-core-spec-os-en.html.

Oasis, "Profiles for the OASIS Security Assertion Markup Language (SAML) V2.0," Mar. 15, 2005.

OpenId, "Welcome to OpenID Connect," retrieved online Jul. 30, 2019, https://openid.net/connect/.

* cited by examiner

IDENTITY INTERMEDIARY SERVICE AUTHORIZATION

BACKGROUND

Prior to using a service, application, or other similar digital resources, a user may request authorization for use thereof. Authorization may be provided by a trusted identity provider (IdP), which may be the requested resource itself, or may be a third party authenticator. Specifically, the IdP may be a third party authenticator preconfigured to accept authentication requests for a resource, and the process of federated authentication may include redirecting a user to the IdP. The IdP may accept credentials from the user, which may include a username, one-time passcode, biometrics, or any other form of credentials for verifying the identity of the resource requestor, and the IdP may accept or reject access to the resource based on the credential/s provided.

BRIEF DESCRIPTION OF THE DRAWINGS

The following detailed description references the drawings, wherein.

DETAILED DESCRIPTION

Figure 1:
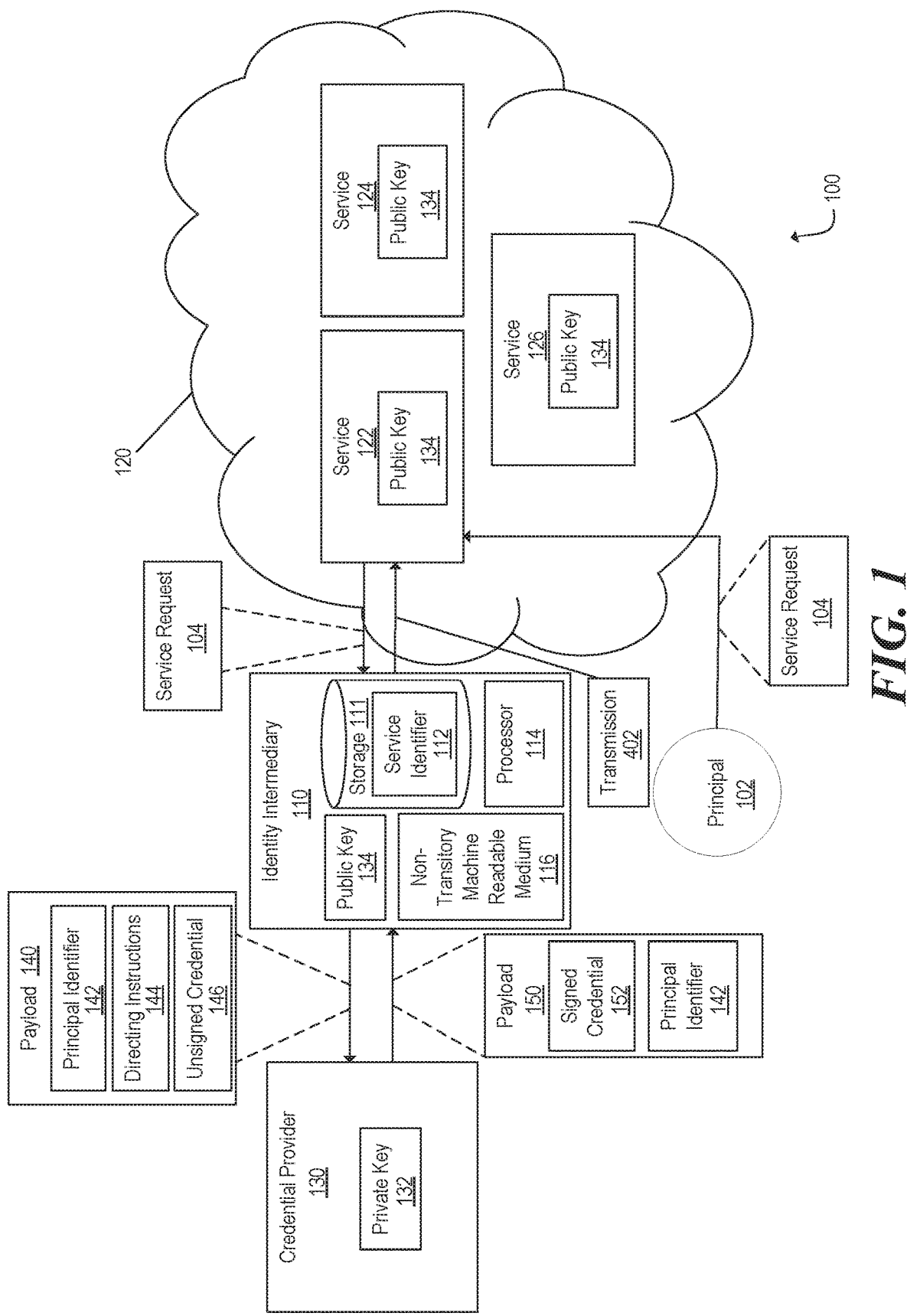
FIG. 1 is a block diagram of an example system including an identity intermediary for facilitating the authorization of a principal for access to a service.

Open standard protocols for authentication, such as Security Assertion Markup Language (SAML) and OpenID, include protocols for authenticating resource requesters, also known as principals or users, for the utilization of a service based on stored principal credentials. An identity provider (IdP), also referred to herein as a credential provider, is a system entity that stores and otherwise manages identity information of a principal, and may offer principal authentication as a service, often by standard compliant means. The identity provider may have stored credentials, such as a principal identity, of a principal, and these stored credentials may be leveraged for seamless authentication of a principal for use of a digital resource.

SAML single sign-on (SSO) login standard may transfer authorization credentials across security domains. For example, SAML SSO may enable the passing of authorization credentials from an identity provider domain to a service provider domain. In an example, the authorization credentials may be transferred through the exchange of digitally signed documentation. A document that provides service information about a principal may be referred to as an assertion. According to SAML protocol, assertions may take the form of Extensible Markup Language (XML) documents, enabling standardized communication between identity providers (IdPs) and Service providers (SPs).

Thus, a SAML identity provider may be an identity provider that issues assertions in conjunction with a SAML SSO profile, and a service provider that consumes these authentication services with the SAML SSO profile may be a SAML service provider. Linking principal credentials with the services that seek these credentials for authorization via SAML SSO enables a principal to log in to multiple services, applications, websites, and/or any other resources that seek principal authorization credentials via a single login.

Authentication protocols may be executed in any number of ways. In an example, the protocol may be SP initiated. In this example, an unauthenticated principal requests a resource of a service. For instance, a principal may request to access a page of a website, provision a resource, or any number of other requests for service resources. Responsive to the request, an SP may redirect the request to a SSO Uniform Resource Locator (URL) hosted by an IDP.

The principal may authenticate to the IdP. This may occur via an entry of login credentials, such as a principal name and password, via bioinformatics, and/or any number of methods for principal authentication. The IdP, responsive to the authentication, may transmit a signed, i.e. validated, assertion to the principal for transmission to the SP. In an example, the assertion may be signed with XML syntax according to XML Signature Syntax and Processing standards. The principal may transmit the signed assertion to the SP, whereby the SP may verify the assertion against a certificate.

In another example, the protocol may be IdP initiated. In this example, the principal authenticates directly to the IdP, and specifies to which service the principal is to be directed. In this example, the IdP may transmit a signed assertion to the principal for transmission to an SP. The principal may transmit the signed assertion to the SP, whereby the SP may verify the assertion against the certificate.

A principal may seek authentication for a plurality of services. To authenticate these services, an IdP may store different credentials, e.g. a public/private key pair, for each service. Each respective service may receive a unique public key or other unique authentication values for identifying the service. In this example, the IdP transmits a signed assertion to the principal for each service to be authenticated. For a specific user, then, the IdP either crafts and stores unique-to-one-service signed assertions, or crafts a new assertion each time the user requests authentication.

Referring now to the drawings, FIG. 1 is a block diagram of an example system 100 including an identity intermediary 110 for facilitating the authorization of a principal for access to a service of a plurality of services. For example, identity intermediary 110 may facilitate the authorization of principal 102 to any number of services, e.g. services 122-126 of a like network, e.g. network 120. In an example, network 120 may be an administrative grouping of one or more services, application, and/or any number of other digital resources. In an example, principal 102 may have access to each service 122-126 respectively, of network 120, and may gain access to services 122-126 using one set of access credentials. As an example, a principal with permissions to access example network 120 may not use these same permissions to access a different network. Services 122-126, and/or other digital resources of a network 120 may be on separate physical devices, virtually partitioned on a same physical device, or any combination thereof.

In an example, system 100 may be preconfigured such that a public/private key pair is generated to sign credentials, e.g. authentication certificate documents. The public/private key pair may be generated and dispersed according to any number of computer network security protocols, including standard protocols e.g. OpenSSL, NSS, LibreSSL, etc. Upon generation of the public/private key pair, the private key 402 of the public/private key pair may be provided to credential provider 406, and the public key of the public/private key pair may be provided to identity intermediary 110, and to any number of services 122-126. In this example, each service of network 120, i.e., services 122-126, may receive a like public key of the public/private key pair.

In an example implementation, identity intermediary 110, responsive to receiving the public key, may create child credentials that bundle the public key with implementation-specific values used by services 122-126 to authenticate any received, valid signed documents. Identity intermediary 110 may pass these child credentials to services 122-126 such that services 122-126 may verify any documents signed by credential provider 406.

In an example, principal 102 may request access to a service, e.g., service 122 of network 120, via a service request 104. Principal 102 may in some examples, transmit service request 104 to service 122. In this example, service 122 may redirect service request 104 of principal 102 to identity intermediary 110. In some examples, principal 102 may transmit service request 104 directly to identity intermediary 110.

Identity intermediary 110 may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium 116 and the hardware for the engines may include at least one processing resource, e.g. processor 114, to execute those instructions. In some examples, the hardware may also include other electronic circuitry to at least partially implement at least one of the engine(s). In some examples, the at least one machine-readable medium 116 may store instructions that, when executed by the at least one processing resource, at least partially implement some or all of the engine(s). In such examples, a computing device may include the at least one machine-readable storage medium 116 storing the instructions and the at least one processing resource 114 to execute the instructions. In other examples, the engine may be implemented by electronic circuitry. Example instructions of machine-readable medium 116 are illustrated and described below with respect to FIG. 5 and FIG. 6. While one such identity intermediary 110 is illustrated at FIG. 1 for purposes of clarity and conciseness, any number of identity intermediaries may be implemented for authorization of access to any number of services 122-126 of network 120.

In examples described herein, a processing resource, e.g. processor 114, may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on machine readable medium 116. In other examples, the functionalities described in relation to any instructions described herein may be implemented in the form of electronic circuitry, in the form of executable instructions encoded on a machine-readable storage medium, or a combination thereof.

Identity intermediary 110 may receive service request 104, and, responsive to receiving service request 104, may store an identifier 112 of service 122, e.g. at storage 111. Storage 111 may include any combination of hard disk drives (HDDs), solid state drives (SSDs), or any other suitable type of storage device, or any combination thereof. While storage 111 is illustrated as local to identity intermediary 110 for purposes of clarity and conciseness, storage 111 may span across multiple hardware devices and may be accessed by identity intermediary 110 remotely, e.g. across a network.

Specifically, identity intermediary 110 may determine that service request 104 was received from service 122, and, responsive to that determination, may store a record, e.g. identifier 112, indicating that service request 104 of principal 102 was routed from service 122. In another example implementation, principal 102 may directly transmit service request 104 to identity intermediary. In this implementation, principal 102 may otherwise indicate to identity intermediary 110 the service for requested access, and an identifier of the service 112 to be accessed may be stored at storage 111.

Identity intermediary 110 may transfer an unsigned credential 146 of principal 102, service request 104, and/or the principal itself, to credential provider 130. In an example, identity intermediary 110 may verify the authorization of the principal against public key 134 of identity intermediary 110 prior to transferring unsigned credential 146 to credential provider 130. Identity intermediary may transfer service request 104, and/or unsigned credential 146 to credential provider 130 via payload 140. Payload 140 may include a principal identifier 142. In an example, principal identifier 142 may be data uniquely identifying principal 102. Payload 140 may additionally include directing instructions 144. Directing instructions 144 may, for example, include instructions for credential provider 130 to redirect principal 102, principal identifier 142, and/or validated credentials, back to identify intermediary 110 upon validation.

Credential provider 130 may receive an unsigned credential 146 of principal 102 via service request 104 of payload 140, or, in some example implementations, directly from principal 102, where identity intermediary 110 transmits principal 102 directly to credential provider 130. The credential may include a username, one-time passcode, biometrics, or any other form of verification for validating the identity of principal 102. Credential provider 130 may compare the provided credential, also referred to herein as an assertion, against private key 132, and, where the credential is proper, may sign, i.e. validate, the credential of principal 102. In an example, the assertion may be signed with XML syntax according to XML Signature Syntax and Processing standards.

Credential provider 130 may further transmit the signed credential 152 and principal identifier 142 to identity intermediary 110 via payload 150 according to directing instructions 144. In another example, credential provider 130 may, according to directing instructions 144, redirect principal 102, having signed credential 152, to identity intermediary 110. In another example implementation, credential provider 130 may, according to directing instructions 144, redirect principal 102 to the requested service with the signed credential 152.

Where identity intermediary receives the signed credential 152, identity intermediary may identify principal 102 and/or signed credential 152 via principal identifier 142. Specifically, identify intermediary 110 may look up service identifier 112 via principal identifier 142. In this illustrated example, identity intermediary 110 may determine from service identifier 112 that signed credential 152 is to be transmitted to service 122 of network 120. In an example implementation, principal 102 is directed to service 122 with signed credential 152. Accordingly, a principal may be granted access to a service of a network including multiple services sharing authentication credentials.

Figure 2:
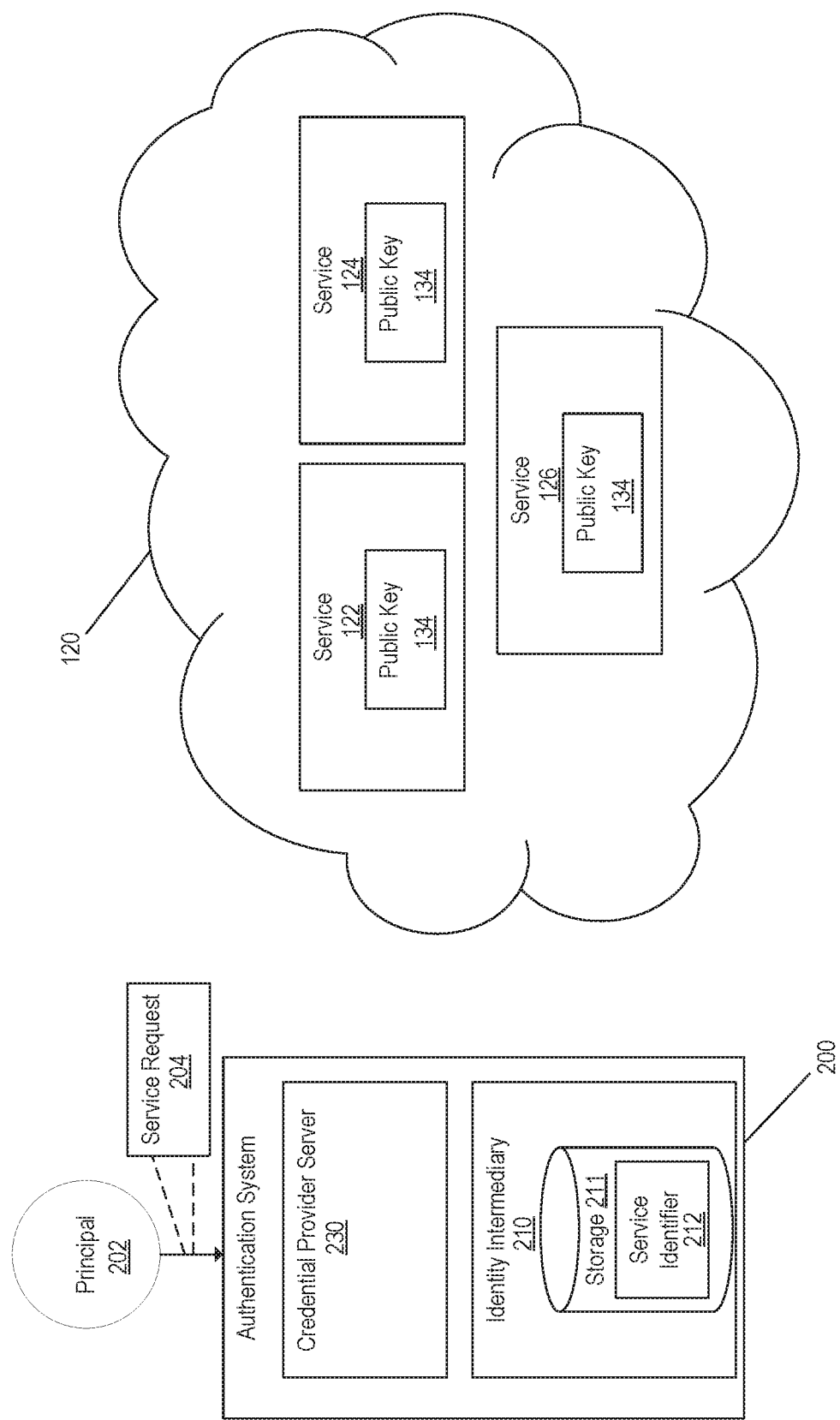
FIG. 2 is a block diagram illustrating an authentication system including an identity intermediary and credential provider server for facilitating the authorization of a principal for access to a service.

FIG. 2 is a block diagram illustrating an authentication system 200 including an identity intermediary 210 and credential provider server 230 for facilitating the authorization of a principal for access to a service. Authentication system 200 may be in communication with network 120 of FIG. 1, and specifically with any of services 122-126 of network 120.

Authentication system 200 may include an identity intermediary 210 and a credential provider server 230. Identity intermediary may receive a service request 204 to access a service, e.g. service 122, of network 120. Identity intermediary, responsive to receiving request 204, may store a service identifier 212, e.g. at storage 211. Service identifier 212 may be a record identifying the service for which access is requested. Like storage 111 described above, storage 211 may include any combination of hard disk drives (HDDs), solid state drives (SSDs), or any other suitable type of storage device, or any combination thereof. While storage 211 is illustrated as local to identity intermediary 210 for purposes of clarity and conciseness, storage 211 may span across multiple hardware devices and may be accessed by identity intermediary 210 remotely, e.g. across a network.

Authentication system 200 may further include a credential provider server 230. Credential provider server 230 may receive an unsigned credential of the principal, the principal itself, and/or a principal identifier from the identity intermediary. Credential provider server 230 may be a computing device including hardware and any combination of software to store and otherwise manage identity information of a principal, and may offer principal authentication as a service. Credential provider server 230 may be a processing device or equipment including a processing resource. In examples described herein, a processing resource may include, for example, one processor or multiple processors included in a single computing device or distributed across multiple computing devices.

Credential provider server 230 may, upon receiving the unsigned credential and principal identifier, verify principal 202, e.g. against a private key stored by the credential provider (not shown), and sign the credential. Credential provider server 230 may transfer the signed credential and the principal identifier to identity intermediary 210. In an example implementation, credential provider server 230 may cache a session with principal 102 such that principal 102 may not require reauthentication for future service access requests from principal 102 for services of network 120. Specifically, credential provider server 230 may cache the assertion provided to principal 102.

Identity intermediary 210 may use the principal identifier to transmit the signed credential to the requested service, e.g. service 122. In some example implementations, identity intermediary 210 may direct principal 202 to service 122 with the signed credential.

Specifically, identity intermediary 210 may use the principal identifier to identify principal 202, and look up the stored service identifier 212 associated with principal 202. In an example implementation, principal identifier may be a mapping and/or storage address of service identifier 212. From the service identifier, service 122 may be determined as the service of which access by principal 202 is requested. Principal 202 may, responsive to this determination, be transmitted to service 122 with signed credential 152 for authorized access to service 122.

Figure 3:
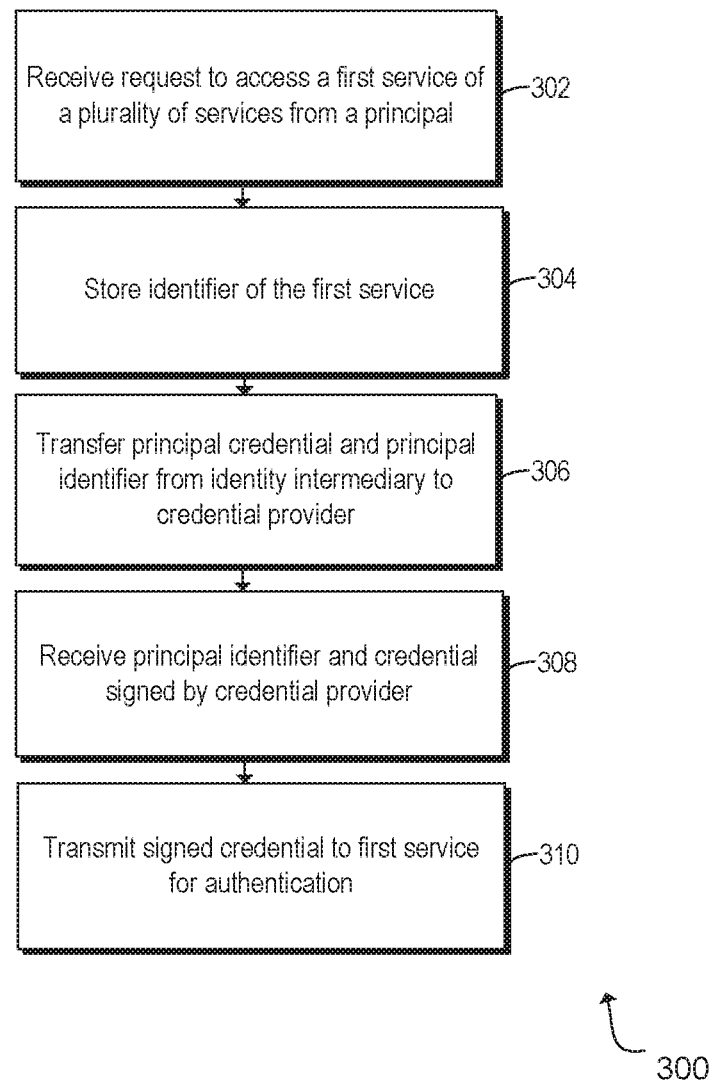
FIG. 3 is an example method for authenticating a service request of a principal.
Figure 4:
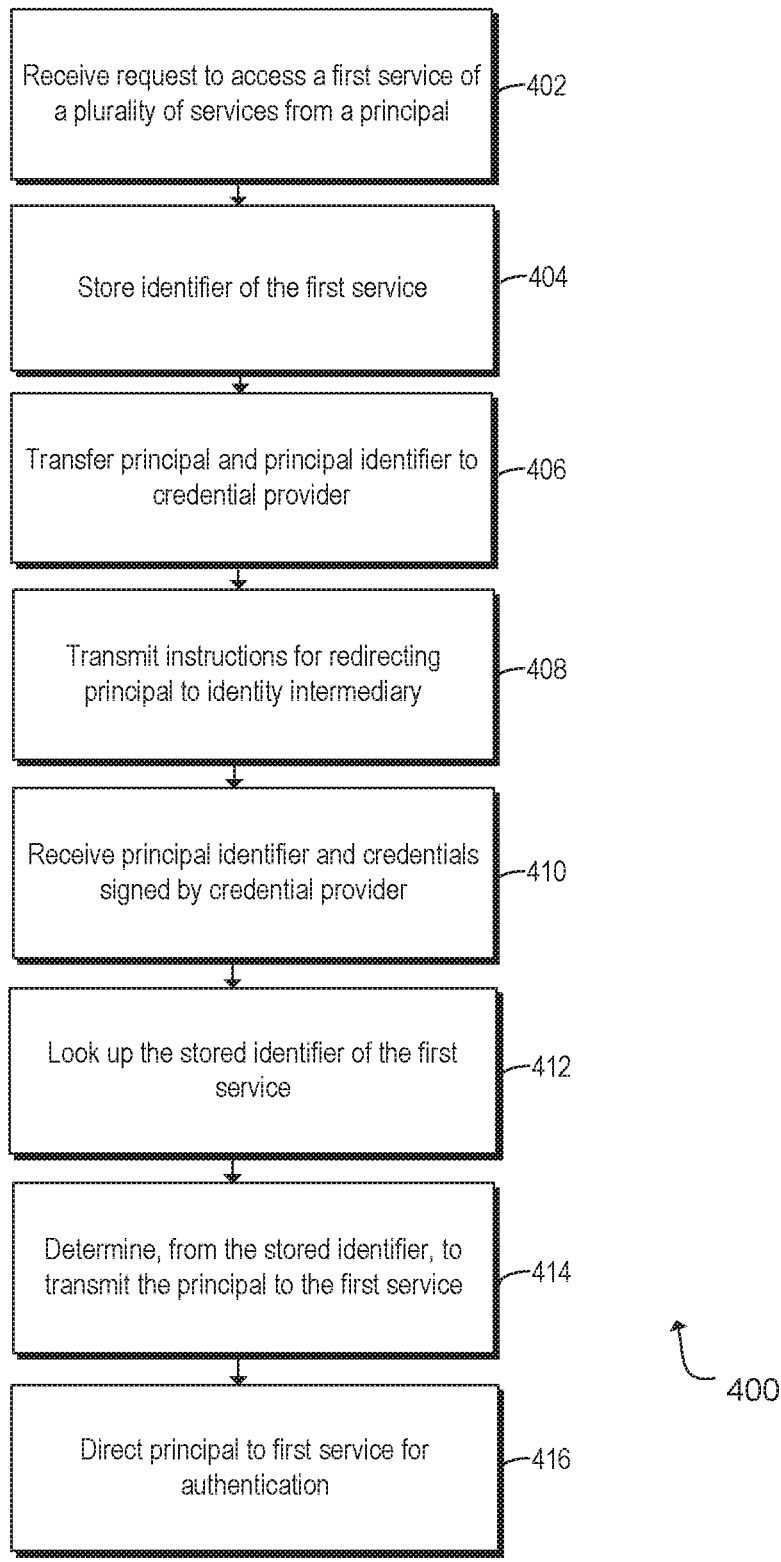
FIG. 4 is another example method for authenticating a service request of a principal.

FIG. 3 and FIG. 4 are example methods for authenticating a service request of a principal. Execution of method 300 and method 400 is described below with reference to system 100; however, this is for explanatory purposes and other suitable components for execution of method 300 and/or method 400 may be utilized. Additionally, the components for executing method 300 and/or method 400 may spread among multiple devices. Method 300 and/or method 400 may be implemented in the form of executable instructions stored on a non-transitory machine-readable storage medium and/or in the form of electronic circuitry, e.g. hardware. In some examples, steps of method 300 and/or method 400 may be executed substantially concurrently or in a different order than shown in FIG. 3 and FIG. 4 respectively. In some examples, method 300 and/or method 400 may include more or less steps than are shown in FIG. 3 and FIG. 4 respectively. In some examples, some of the steps of method 300 and/or method 400 may, at certain times, be ongoing and/or may repeat.

At block 302, a request to access a first service of a plurality of services from a principal may be received. For example, as described above with respect to FIG. 1, principal 102 may submit a service request 104 to access service 122 of network 120 having services 122-126. Service request 104 may, in an example implementation, be received directly by identity intermediary 110, or indirectly from service 122.

At block 304, an identifier of the service requested may be stored. In an example implementation, identity intermediary 110 may store service identifier 112, e.g. at storage 111, responsive to receipt of service request 104. For instance, principal 102 may request access from example service 122 via a Uniform Resource Locator (URL), e.g. https://service122.com/login. The user may then be redirected from the URL to identity intermediary 110, which may record from where principal 102 originated, in this case service 122.

At block 306, a credential of the principal and a principal identifier may be transferred to the credential provider. For example, identity intermediary 110 may transfer principal 102 and principal identifier 142 to credential provider 130. At block 308, the principal identifier and a credential signed by the credential provider may be received. For instance, identity intermediary 110 may receive back transferred principal identifier 142, in addition to a credential 152 signed by credential provider 130.

Credential provider 130, responsive to receiving principal 102 and principal identifier 142 from identify intermediary 110, may validate a credential principal 102, e.g. against private key 132. Upon validation, credential provider 130 may sign the credential, to be returned by principal 102 to identity intermediary 110. In an example implementation, identity intermediary 110 provides credential provider 130 directing instructions, e.g. directing instructions 144, for transferring principal 102 back to identity intermediary 110 with the signed credential.

At block 310, the principal may be transmitted to the service for which access was requested for authentication. For example, identity intermediary 110 may identify principal 102 via received principal identifier 142, whereby identity intermediary 110 may transmit principal 102 to example service 122 with signed credential 152 for authentication.

Turning to block 402 of FIG. 4, a request may be received to access a first service of a plurality of services from a principal. As described above, the service request 104 may in an example implementation be received directly by identity intermediary 110, or indirectly from service 122. At block 404, an identifier of the first service is stored. Identity intermediary 110 may, for example, store a record identifying the first service, i.e. service identifier 112, responsive to receipt of service request 104.

At block 406 a principal and principal identifier may be transferred to a credential provider. For example, identity intermediary 110 may, as described above, transfer principal 102 and principal identifier 142 to credential provider 130. At block 408, instructions for redirecting the principal to the identity intermediary may be transmitted. For example, identity intermediary 110 may provide credential provider 130 with directing instructions 144 for transferring principal 102 back to identity intermediary 110 with the signed credential. In an example implementation, service request 104 of principal 102, principal identifier 142, and directing instructions 144 are transmitted to credential provider 130 via payload 140.

Credential provider 130 may sign a credential of principal 102 as described above, and according to directing instructions 144, may transfer principal 102 back to identity intermediary with signed credential 152 and principal identifier 142. At block 410, the principal identifier and the signed credential may be received, e.g. from credential provider 130.

At block 412, a lookup may be initiated for the stored identifier of the first service. For example, principal identifier 142 may be a mapping and/or storage address of service identifier 112. In another example implementation, principal identifier 142 may identify principal 102. Principal 102 may be associated with service identifier 112 such that identification of principal 102 may enable a lookup of service identifier 112. Identity intermediary 110 may receive principal identifier 142 and, from principal identifier 142, look up service identifier 112.

At block 414, it may be determined from the stored identifier to direct the principal to the first service, e.g. service 122. At block 416, the principal may be directed to the first service, e.g. service 122, for authentication. Specifically, principal 102 may be transmitted with signed credential 152 to service 122 for authentication.

Figure 5:
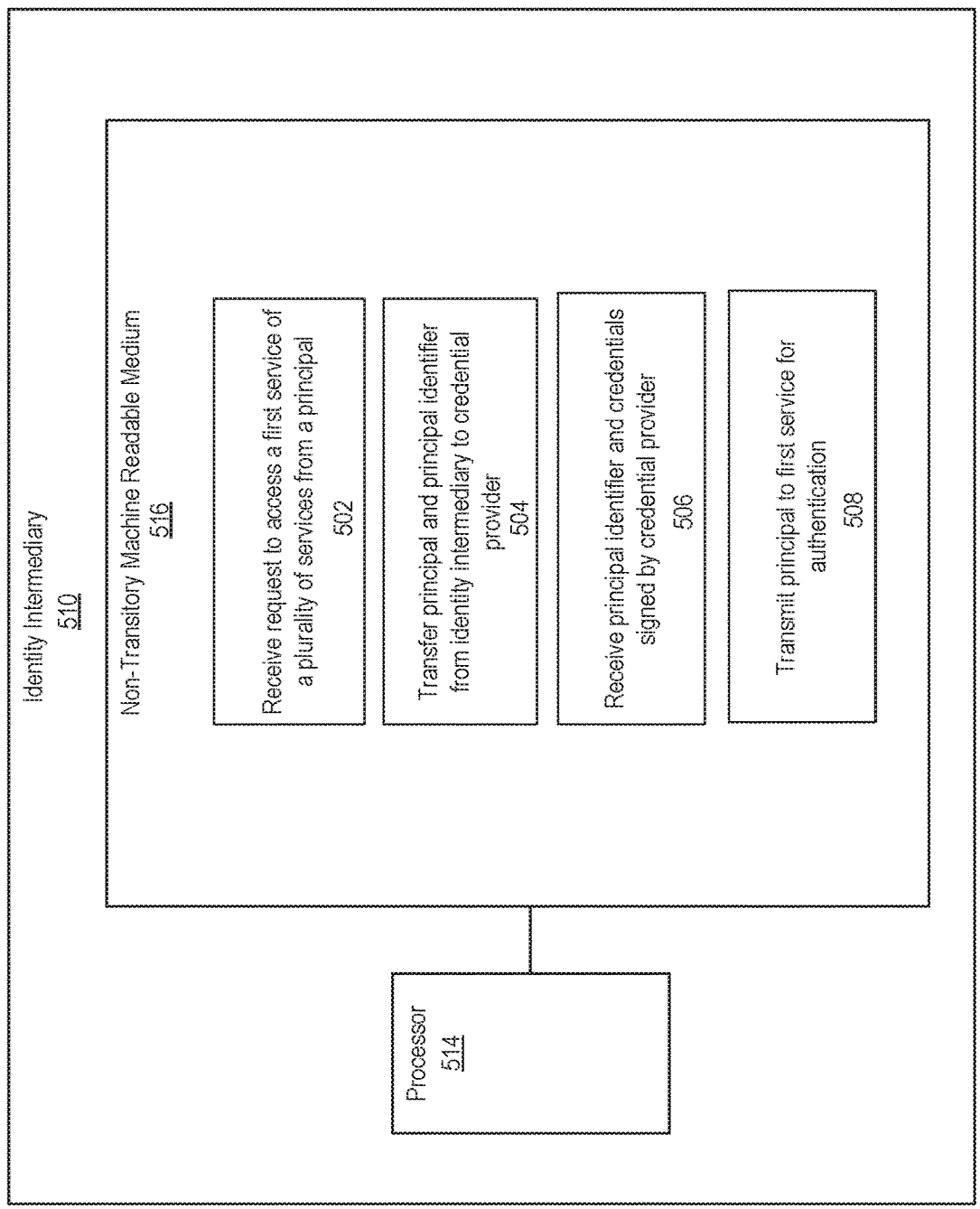
FIG. 5 is a block diagram of an example identity intermediary having a non-transitory machine-readable medium storing instructions for service access authentication.
Figure 6:
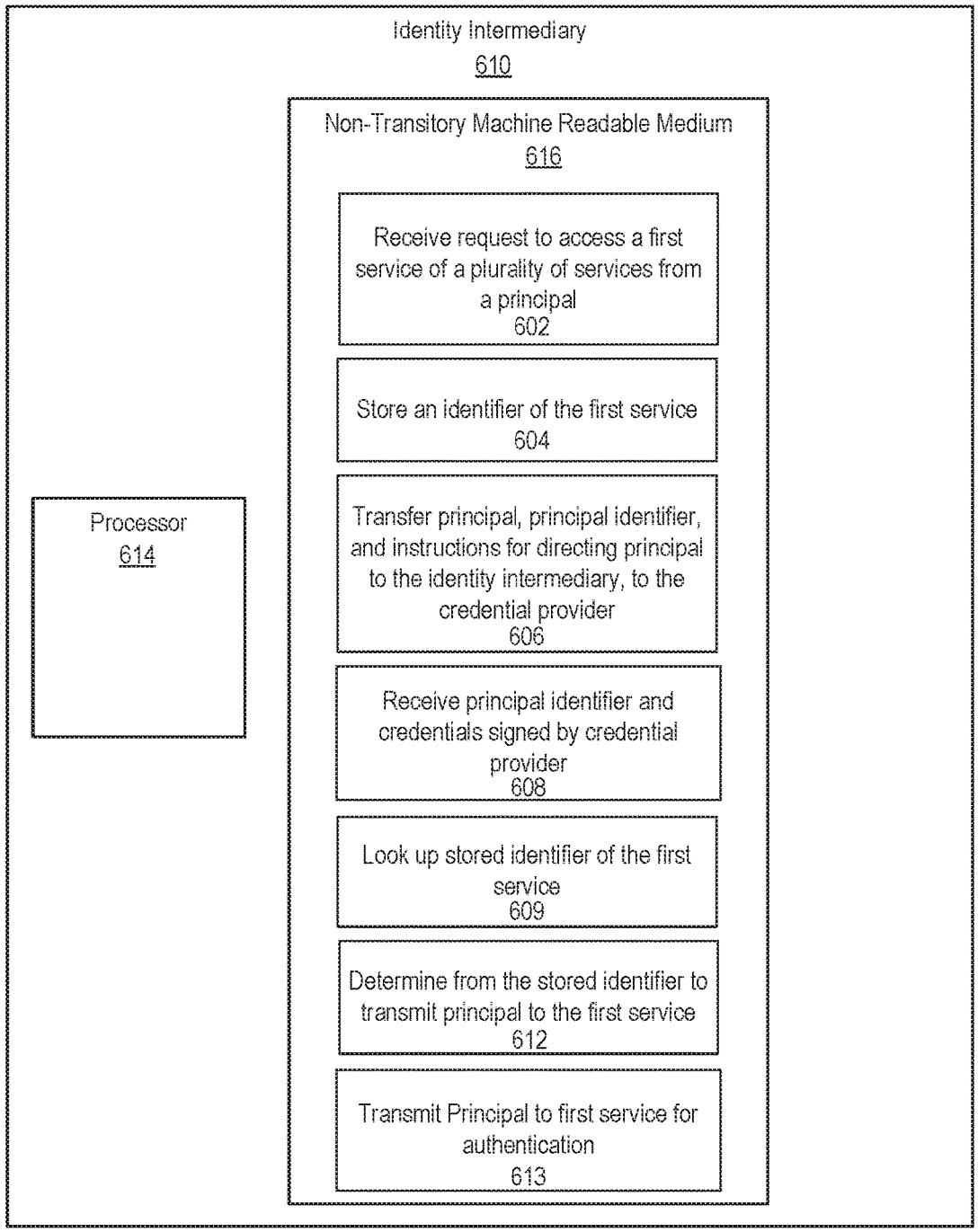
FIG. 6 is another block diagram of an example identity intermediary having a non-transitory machine-readable medium storing instructions for service access authentication.

FIG. 5 and FIG. 6 are block diagrams, 500 and 600 respectively, of an example identity intermediary having non-transitory machine-readable mediums storing instructions for service access authentication. Non-transitory machine-readable storage medium 516 of FIG. 5 may be coupled to a processor, e.g. processor 514, and non-transitory machine-readable storage medium 616 of FIG. 6 may be coupled to a processor, e.g. processor 614. Non-transitory machine-readable storage medium 516 and non-transitory machine-readable storage medium 616 may include executable instructions thereon.

Non-transitory machine-readable storage medium 516 (or non-transitory machine-readable storage medium 616) may be implemented in a single device or distributed across devices. Likewise, processor 514 (or processor 614) may represent any number of physical processors capable of executing instructions stored by non-transitory machine-readable storage medium 516 (or non-transitory machine-readable storage medium 616). Further, non-transitory machine-readable storage medium 516 (or non-transitory machine-readable storage medium 616) may be fully or partially integrated in the same device as processor 514 (or processor 614), or it may be separate but accessible to that device.

In one example, the instructions may be part of an installation package that when installed can be executed by processor 514 (or processor 614) to execute threat-aware copy data management. In this case, non-transitory machine-readable storage medium 516 (or non-transitory machine-readable storage medium 616) may be a portable medium such as a floppy disk, CD, DVD, or flash drive or a memory maintained by a server from which the installation package can be downloaded and installed. In another example, the program instructions may be part of an application or applications already installed. Here, non-transitory machine-readable storage medium 516 (or non-transitory machine-readable storage medium 616) may include a hard disk, optical disk, tapes, solid state drives, RAM, ROM, EEPROM, or the like.

Processor 514 or 614 may be a central processing unit (CPU), graphics processing unit (GPU), microprocessor, and/or other hardware device suitable for retrieval and execution of instructions stored in non-transitory machine-readable storage medium 516 (or non-transitory machine-readable storage medium 616). Processor 514 may fetch, decode, and execute program instructions 502-508, and/or other instructions. Similarly, processor 614 may fetch, decode, and execute program instructions 602-613. As an alternative or in addition to retrieving and executing instructions, processor 514 may include at least one electronic circuit comprising a number of electronic components for performing the functionality of instructions 502-508, and/or other instructions. Similarly, processor 614 may include at least one electronic circuit comprising a number of electronic components for performing the functionality of instructions 602-613, and/or other instructions.

Turning to FIG. 5, non-transitory machine readable medium 516 may include instructions 502 for receiving a request to access a service from a principal. As described above, the request, in an example implementation may be received directly by identity intermediary 510. In another example, the request may be received indirectly, e.g. from service 122 of FIG. 1. Instructions 504, when executed, may transfer a principal identifier, and/or the principal from identity intermediary 510 to a credential provider, e.g. credential provider 130 or 230 of FIG. 1 or 2 respectively.

Non-transitory machine readable medium 516 may include instructions 506 for receiving the principal identifier and credentials signed by the credential provider, e.g. credential provider 130. Instructions 508, when executed, may further transmit the principal to the service for which access is requested for authentication. In an example, the principal may be directed to the service with the credential signed by the credential provider.

Turning to FIG. 6, non-transitory machine-readable storage medium 616, like non-transitory machine readable medium 516 of FIG. 5, may include instructions 602 for receiving a request to access a service from a principal.

Instructions 604, when executed, may store an identifier of the service. For example, responsive to receipt of the request to access the service, identity intermediary 610 may store a record identifying the service, and otherwise mapping the record to the principal.

Instructions 606, when executed, may transfer the principal, the principal identifier, and/or instructions for directing the principal to the identity intermediary, to the credential provider. As an example, (referring to FIG. 1) identity intermediary 110 may provide credential provider 130 with directing instructions 144 for transferring principal 102 back to identity intermediary 110 with the signed credential. In an example implementation, identity intermediary 610 may provide the credential provider with directing instructions for transferring the principal, and a signed credential of the principal, directly to the service for which access is requested for authentication.

Instructions 608, when executed, may receive the principal identifier and the credential signed by the credential provider from the credential provider. Instructions 609, when executed, may look up the stored identifier. For example, the principal identifier received by identity intermediary 610 may be a mapping and/or storage address of the stored identifier. In another example implementation, the principal identifier may identify the principal. The principal may be associated with the service identifier such that identification of the principal may enable a look up of the service identifier. Identity intermediary 610 may receive the principal identifier, and, from the principal identifier, look up the service identifier.

Instructions 612, when executed, may determine from the stored identifier to transmit the principal to the service for which access is requested. Instructions 613, when executed, may transmit the principal to the first service, e.g. service 122 of FIG. 1, for authentication. Specifically, the principal may be transmitted with the signed credential to the requested service for authentication.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A method to be executed by a processor of an identity intermediary, the method comprising:
   receiving, by the identity intermediary, a request to access a first service of a plurality of services of a network from a principal, wherein the request comprises a service identifier of the first service;
   storing, in a storage device of the identity intermediary, the service identifier of the first service;
   sending, by the identity intermediary, an unsigned credential of the principal and a principal identifier to a credential provider;
   receiving, from the credential provider, the principal identifier and the credential signed by the credential provider, wherein the signed credential indicates validation of the credential;
   responsive to receiving the credential signed by the credential provider, looking up the principal identifier in the storage device to determine the service identifier of the first service; and
   sending, by the identity intermediary, the signed credential to a service provider providing the first service for authentication.

2. The method of claim 1, further comprising sending, to the credential provider, instructions for redirecting the principal identifier to the identity intermediary upon the credential provider signing the credential.

3. The method of claim 2, wherein the instructions for redirecting the principal identifier are transmitted to the credential provider server through a payload of a packet.

4. The method of claim 1, further comprising sending, by the identity intermediary, the principal identifier with the signed credential to the service provider of the first service.

5. The method of claim 1, wherein the credential is signed via a public/private key pair.

6. The method of claim 5, wherein each of the plurality of services of the network authenticate a principal with a corresponding public key.

7. The method of claim 6, wherein each of corresponding public keys is further associated with a child credential generated by the identity intermediary.

8. The method of claim 5, further comprising receiving a public key of the public/private key pair, wherein the public key is shared with respective service providers of the plurality of services for authentication, and the private key is stored at the credential provider.

9. A computing system operating as an identity intermediary, comprising:
   a storage device;
   one or more processors; and
   a non-transitory, computer-readable medium including instructions that, when executed by the one or more processors, cause the computing system to:
      control receive a request to access a first service of a plurality of services of a network from a principal, wherein the request comprises a service identifier of the first service;
      store, in the storage device, the service identifier of the first service;
      send an unsigned credential of the principal and a principal identifier to a credential provider;
      receive the credential signed by the credential provider and the principal identifier, wherein the signed credential indicates validation of the credential;
      upon receiving the signed credential and principal identifier, look up the principal identifier in the storage device to determine the service identifier of the first service; and
      send the signed credential to a service provider providing the first service for authentication.

10. The computing system of claim 9, wherein the instructions, when executed by the one or more processors, cause the computing system to send, to the credential provider, instructions for redirecting the principal identifier to the identity intermediary upon the credential provider signing the credential.

11. The computing system of claim 10, wherein the instructions for redirecting the principal identifier are transmitted to the credential provider through a payload of a packet.

12. The computing system of claim 9, wherein the credential is signed via a private key of the credential provider.

13. The computing system of claim 9, wherein the instructions, when executed by the one or more processors, cause the computing system to receive a public key of a public/private key pair, wherein a private key of the public/private key pair is stored at the credential provider, and a public key of the public/private key pair is shared with respective service providers of the plurality of services for authentication.

14. The computing system of claim 13, wherein the instructions, when executed by the one or more processors, cause the computing system to generate a child credential from the public key.

15. The computing system of claim 9, wherein the instructions, when executed by the one or more processors, cause the computing system to send the principal identifier with the signed credential to the service provider of the first service.

16. A non-transitory machine-readable medium comprising instructions executable by a processor of an identity intermediary, the processor upon execution to:
   receive a request to access a first service of a plurality of services of a network from a principal, wherein the request comprises a service identifier of the first service;
   store, in a storage device of the identity intermediary, the service identifier of the first service;
   send an unsigned credential of the principal and a principal identifier to a credential provider;
   receive the principal identifier and credential signed by the credential provider, wherein the signed credential indicates validation of the credential;
   responsive to receiving the credential signed by the credential provider, look up the principal identifier in the storage device to determine the service identifier of the first service; and
   send the signed credential of the principal to a service provider providing the first service for authentication.

17. The non-transitory machine-readable medium of claim 16, further comprising instructions to send, to the credential provider, instructions for redirecting the principal identifier to the identity intermediary upon the credential provider signing the credential.

18. The non-transitory machine-readable medium of claim 16, wherein the credential is signed via a public/private key pair.

19. The non-transitory machine-readable medium of claim 18, further comprising instructions to receive a public key of the public/private key pair, wherein the public key is shared with respective service providers of the plurality of services for authentication, and the private key is stored at the credential provider.

20. The non-transitory machine-readable medium of claim 16, further comprising instructions to send the principal identifier with the signed credential to the service provider of the first service.

* * * * *